United States Patent Office 3,382,190
Patented May 7, 1968

3,382,190
CATALYTIC METHOD FOR CONDUCTING CHEMICAL REACTIONS
William F. Wolff, Park Forest, Ill., assignor to Standard Oil Company, Chicago, Ill., a corporation of Indiana
No Drawing. Filed Jan. 7, 1965, Ser. No. 424,118
3 Claims. (Cl. 252—477)

ABSTRACT OF THE DISCLOSURE

Substances susceptible to catalytic conversion are introduced into a reaction zone in which the catalyst has been prepared therein by passing an electric current through a conductive, wirelike material. The sudden appliction of current causes disintegration of said material and produces an active catalyst of small particle size and high surface area. Metal catalysts, such as platinum, nickel or nickel-chromium alloy, may be prepared in this manner and used in the isomerization of a hydrocarbon.

This invention relates to chemical reactions and, more specifically, to preparation of catalysts for chemical reactions.

Conventional methods of catalyst manufacture normally include forming a solution of a catalytic element and treating an adsorbent solid with the solution to impregnate the catalytic element onto the surface of the solid. The impregnated solid is then treated to convert the element into a more active form, such as by oxidation, reduction, decomposition of the impregnated compound, sulfiding, etc. While these techniques produce active catalysts they usually represent an inefficient use of the catalytic elements because of the deposition of the elements onto and within inaccessible sites and pores of the solid support. The present invention overcomes these difficulties and others by providing more complete utilization of catalytic elements in effecting catalysis of chemical reactions. This is particularly important where expensive precious metals, such as platinum, are used as catalysts.

Accordingly, this invention provides a method of catalyzing a chemical reaction which method comprises disintegrating a solid catalytic material in a reaction zone by the sudden application of electrical energy to said solid and subsequently passing reactants into said zone.

The invention also provides a method of producing a hydrocarbon conversion catalyst which method comprises suddenly applying an electromotive force to a solid conductive catalytic material to disintegrate said solid and produce an active catalyst of small particle size and high surface area.

The invention further provides a method of catalyzing a chemical reaction, which method comprises exploding solid catalytic material in a reaction zone by sudden application of electromotive force across said solid to produce particles of said solid and subsequently introducing a reactant chemical into said zone into contact with said particles to effect a chemical reaction.

The invention still further provides a method of forming a catalyst active for catalyzing organic chemical reactions, which method comprises first exploding a metal wire within a reaction zone by sudden application of electromotive force across said wire and subsequently introducing organic chemical reactants into said zone to effect reaction thereof.

The invention also still further provides a method of catalyzing organic chemical reactions, which method comprises contacting organic chemical reactants with a catalyst prepared by disintegrating a wire of catalytic metal by the sudden passage of electric current through said wire and contacting said reactants with the product of said disintegration.

The process or method of this invention comprises contacting a substance or mixture of substances, susceptible to catalytic conversion, with a catalyst prepared by passing a powerful electric current through a conductive material. Conductive materials suitable for the process are substances or mixtures of substances which, in a sufficiently fine state of subdivision, are catalysts for the desired reaction, either by themselves, by reaction with one another, or by reaction with a suitable atmosphere. The conductive material is employed in such a form, and a sufficiently powerful electric current is used such that a substantial portion or all of the material is disintegrated, or exploded, with the formation of microscopic particles. The conductive material is conveniently in the form of a fine wire, but substances in other shapes and states, for example powders and liquids, may also be exploded.

Preferably the catalyst preparation and the catalysis proper are carried out in separate steps. The heat and radiation generated by the explosion can cause undesirable side-reactions, particularly with organic compounds. The catalyst can be prepared in a liquid or gaseous medium or in vacuum, as is appropriate and convenient. The process can be carried out as a batch process or a continuous process. To obtain a suitable continuous process the wire can be exploded in a semicontinuous manner. For example, the wire can be extruded from one electrode continuously, to make contact with the second electrode. In such a system the extrusion electrode should desirably be made, in part or whole, of a substance such as graphite to avoid welding of the incompletely extruded wire to the electrode. The catalyst formation may be carried out in a separate preparation zone and the catalyst swept into the reaction zone by a flowing fluid, conveniently one of the reactants. Example I is a preferred embodiment of the invention.

Either direct current or alternating current may be employed to disintegrate the catalyst material, however, when alternating current is employed a switching device or other means is preferably used to apply the voltage to the material at the point in the cycle where the voltage is rising.

EXAMPLE I

A one hundred ml. three-necked flask was fitted with two glass-sealed tungsten lead-in wires to which were fastened small spring clips. To the clips a ¾-inch piece of 30-gage platinum wire was fastened, with 5/16-inch of the wire stretching between the extremity of one clip to the other. The flask was so fitted as to allow it to be evacuated, the pressure in the flask to be measured, and gases to be introduced into the flask. A thermocouple, between the bottom of the flask and a heating mantle, was used to measure temperature. The flask was evacuated to a pressure of 0.2 mm. mercury and heated to 292° C. Hydrogen was then introduced to a pressure of 333 mm. mercury below atmospheric pressure. After testing the electrical connections at 2000 volts, the portion of the platinum wire between the two spring clips was exploded by discharging a four microfarad condenser, charged to 4800 volts, through it. The amount of platinum thus disintegrated was ca. 0.3 milligram. Butene-1 was then rapidly introduced into the flask so as to bring the pressure to atmospheric. The flask temperature dropped from 280° C. to 255° C. during the following fifteen minutes and the pressure dropped to 186 mm. mercury below atmospheric pressure. The flask was then rapidly cooled to room temperature, argon introduced to bring the pressure to atmospheric, and a sample was withdrawn for gas-chromatographic analysis. Analysis of the hydrocarbon product showed it to contain 67% n-butane, 16% trans-2-butene, 11% cis-2-butene, and only 6% unreacted butene-1.

EXAMPLE II

By way of comparison to show the advantage of the method of the present invention, the above run was repeated without exploding a wire, but in the presence of a platinum foil with 13 square inches of surface. Analysis of the hydrocarbon product showed it to contain less than 0.1% of reaction products.

EXAMPLE III

To compare the results which would be obtained by using a conventional platinum-chloride-alumina reforming catalyst containing 0.6 wt. percent platinum, 0.5 gram of this catalyst, containing 3 milligrams of platinum, was tested under the conditions employed in Example I. Analysis of the hydrocarbon product showed it to contain 54.5% n-butane, 26% trans-2-butene, 13% cis-2-butene, and 6.5% unreacted butene-1.

EXAMPLE IV

To show the use of 60-cycle alternating current in the method of the invention to disintegrate a platinum wire, a 40-gauge platinum wire $\frac{3}{16}''$ in length was mounted between electrical leads in a 100-ml. flask containing hydrogen at about 0.5 atm. pressure, the flask being heated with a Glas-Col heating mantle at 300° C. The leads to the platinum wire were then switched to a source of 110-volt 60-cycle alternating current at a point in the cycle when the voltage was 100±4 v. and rising. The resulting explosion lasted about 0.6 millisecond. Butene-1 was then introduced into the flask and heating was continued for fifteen minutes. The flask was then cooled and a gas sample withdrawn. Analysis by gas chromatography showed a 95% conversion of butene-1 to n-butane and 2-butenes, catalyzed by the exploded platinum.

EXAMPLE V

To show the reproducibility of the method of the invention, another test under the conditions employed in Example IV above was carried out. Again the resulting explosion lasted about 0.6 millisecond, and the butene-1 conversion, 93% was the same within experimental error. Replicate direct-current explosions under these conditions, but at higher voltages, gave conversions ranging from 93.5–95.5%.

EXAMPLE VI

To show the advantage of switching the catalyst material to be disintegrated into electrical connection with alternating current at a point in the cycle when the voltage is relatively high and rising, three runs were carried out in which the procedures of Examples IV and V were repeated, except that the current was switched on at undesirable (low or decreasing voltage) points in the cycle. With explosion initiation at about 75 volts and rising, the butene conversion was reduced to 86%. With explosion initiation at about 70 volts and rising, the butene conversion was further reduced to 52%. With explosion initiation at about 50–55 volts and dropping, the butene conversion was only 29%.

EXAMPLE VII

To show preparation catalysts from metals other than platinum, nickel and Nichrome (nickel-chromium alloy) wires were disintegrated and tested under conditions similar to those employed in Example I. The nickel catalyst gave results similar to those with platinum, with somewhat greater isomerization activity. The Nichrome catalyst was more selective in that it possessed substantial isomerization activity and very little hydrogenation activity.

EXAMPLE VIII

Supported metal catalysts were prepared by electrical disintegration of metal wires in the presence of powdered glass. The wires were exploded above a relatively thin layer of glass powder in the bottom of the flask under disintegration conditions similar to those employed in Example I. The platinum on glass powder had greater activity than the unsupported exploded platinum catalyst and could be successfully used in repeated runs by evacuating the flask of reaction products and reintroducing hydrogen and butene-1. Exploded nickel on powdered glass, prepared in the same way, also showed good catalyst life with greater isomerization activity than the supported platinum catalyst and lower hydrogenation activity. Exploding platinum in the presence of $Na_2CO_3$ and charcoal gave catalysts having essentially the same activity as unsupported exploded platinum. Platinum exploded onto $P_2O_5$ gave almost entirely double bond isomerization of the butene-1 with essentially no hydrogenation or isomerization.

EXAMPLE IX

The effect of temperature during preparation of catalyst by disintegrating platinum metal onto powdered glass was studied over the temperature range of 25 to 300° C. Different temperatures within this range produced uniformly active catalysts of essentially the same activity, showing no effect of these temperatures of the atmosphere in which the platinum was exploded on catalyst activity.

EXAMPLE X

The pressure and composition of the gaseous atmosphere in which the solid materials are electrically disintegrated are important variables affecting catalyst activity. Using hydrogen atmosphere, as in Example I, maximum catalyst activity was obtained at about ½-atm. pressure with gradually decreasing activity from catalysts prepared at increasing pressures up to 1 atm. As the catalyst preparation pressure was decreased below about ½-atm., activity of the catalysts dropped off sharply. Catalyst prepared at a pressure below about 0.1-atm. possessed almost no catalytic activity. It is theorized that some gas must be present to quench the plasma produced by the electrical disintegration, indicating that the active catalyst is not merely a metallic mirror such as is produced by electrical disintegrations of metals at very low pressures, below 0.1-atm.

Argon and oxygen atmospheres during platinum metal disintegration at a pressure of 1-atm. resulted in catalysts having higher activity than when a hydrogen atmosphere was used at this pressure. An active catalyst was produced by electrical disintegration of aluminum in an oxygen atmosphere at a pressure of 1-atm., giving 5% conversion of butene-1 under reaction conditions similar to those employed in Example 1.

The process of this invention provides a convenient, relatively inexpensive, and extremely versatile means of catalyzing chemical reactions. Furthermore, it provides a means of utilizing freshly prepared catalysts of types that may deteriorate on storage. By proper choice of the voltage and amount of electricity used, almost any known substance or mixture of substances can be converted into particles having suitable physical properties for use in the process. By suitable choices of atmosphere, by consecutive or simultaneous explosions, and/or by employing the heat of the explosion to vaporize nonconductive substances, catalysts having virtually any desired composition can be prepared.

Having thus described the invention, what is claimed is:

1. A method of catalyzing a chemical reaction, which method comprises exploding a wire-like catalytic material in a reaction zone by the application of electromotive force across said catalytic material to produce particles of said material and subsequently introducing a reactant chemical into said zone in contact with the particles to effect a chemical reaction.

2. The method of claim 1 wherein the wire-like catalytic material is a metal.

3. The method of claim 1 wherein said catalytic material is selected from the group consisting of platinum, nickel, or nickel-chromium alloy.

(References on following page)

References Cited

UNITED STATES PATENTS 2,723,947   11/1955   Oblad et al. ------ 260—683.2 X
3,215,751   11/1965   Bourne et al. ------ 260—683.2

OTHER REFERENCES

Chace et al., Exploding Wires, vol. 2, pages 39 and 302–310, Plenum Press, New York, 1962.

Chace et al., Exploding Wires, vol. 3, pages 163–165, 285, 310–312 and 357–358, Plenum Press, New York, 1964.

Kobe et al., Advances in Petroleum Chem. and Ref., vol. III, page 232, Interscience Pub., New York, 1960.

DELBERT E. GANTZ, *Primary Examiner.*

PAUL M. COUGHLAN, JR., *Examiner.*

R. H. SHUBERT, G. J. CRASANAKIS,
                  *Assistant Examiners.*